(12) United States Patent
Watkins et al.

(10) Patent No.: US 11,720,880 B2
(45) Date of Patent: Aug. 8, 2023

(54) SYSTEM FOR WHEELCHAIR-BASED NEAR FIELD COMMUNICATION (NFC) PAYMENT EXTENSION AND STANDARD

(71) Applicant: Mastercard International Incorporated, Purchase, NY (US)

(72) Inventors: Tim M. Watkins, Saint Charles, MO (US); Amanda Kay Gioia, Ballwin, MO (US)

(73) Assignee: Mastercard International Incorporated, Purchase, NY (US)

( * ) Notice: Subject to any disclaimer, the term of this patent is extended or adjusted under 35 U.S.C. 154(b) by 194 days.

(21) Appl. No.: 16/989,428

(22) Filed: Aug. 10, 2020

(65) Prior Publication Data

US 2022/0044225 A1    Feb. 10, 2022

(51) Int. Cl.
| | |
|---|---|
| *G06Q 20/32* | (2012.01) |
| *A47F 9/04* | (2006.01) |
| *A47G 27/02* | (2006.01) |
| *A61G 5/04* | (2013.01) |
| *A61G 5/10* | (2006.01) |

(52) U.S. Cl.
CPC ......... *G06Q 20/3278* (2013.01); *A47F 9/046* (2013.01); *A47G 27/02* (2013.01); *A61G 5/04* (2013.01); *A61G 5/10* (2013.01); *A47F 2009/041* (2013.01)

(58) Field of Classification Search
CPC ............. G06Q 20/3278; A47F 9/046; A47F 2009/041; A47G 27/02; A61G 5/04; A61G 5/10
USPC ........................................................ 705/44
See application file for complete search history.

(56) References Cited

U.S. PATENT DOCUMENTS

| | | | | |
|---|---|---|---|---|
| 2014/0065948 A1* | 3/2014 | Huang | ..................... | H02J 50/70 |
| | | | | 361/679.01 |
| 2016/0247138 A1* | 8/2016 | Wallner | ................ | G07F 7/0893 |
| 2017/0178117 A1* | 6/2017 | McClard | ............ | G06Q 20/3224 |
| 2018/0374180 A1* | 12/2018 | Sprogis | ................... | G07B 15/04 |
| 2019/0052637 A1* | 2/2019 | Dean | ..................... | H04W 12/04 |
| 2019/0365592 A1* | 12/2019 | Norton | ..................... | A61H 3/04 |

* cited by examiner

*Primary Examiner* — Jessica Lemieux
*Assistant Examiner* — Merritt J Hasbrouck
(74) *Attorney, Agent, or Firm* — Hovey Williams LLP

(57) ABSTRACT

A payment facilitating and processing system includes a payment terminal. The payment terminal includes a processor and a first receiver. The first receiver is configured to communicate with the processor. The payment facilitating and processing system further includes a second receiver, which is also configured to communicate with the processor. The payment facilitating and processing system still further includes a mobility assistance device including a transmitter. The transmitter is configured to receive payment information from a payment apparatus and transmit the payment information to the second receiver upon positioning of the transmitter in close proximity to the second receiver.

17 Claims, 6 Drawing Sheets

SYSTEM FOR WHEELCHAIR-BASED NEAR FIELD COMMUNICATION (NFC) PAYMENT EXTENSION AND STANDARD

FIELD

The present invention relates generally to a system enabling convenient participation in a payment process by a person having limited mobility.

BACKGROUND

Those of ordinary skill in the art will appreciate the need for payment processes that facilitate secure, efficient, and comfortable participation by persons having limited mobility. Conventional payment processes, in order to be utilized by such persons, often require relinquishment of one's payment card, mobile device, or so on to a store clerk or other secondary party for insertion into or placement in proximity of a card reader, receiver, or other device associated with the particular payment process. (Such relinquishment is necessitated by the inaccessibility or substantial inaccessibility of the receiving device to the person attempting to make the payment.) In contrast, the present invention facilitates a payment process that is both physically convenient and retains the autonomy of the payer.

SUMMARY OF THE INVENTION

According to one aspect of the present invention, a payment processing system is provided. The payment processing system comprises a payment terminal including a processor and a first receiver. The first receiver is configured to communicate with the processer. The payment processing system further comprises a second receiver spaced from the first receiver and also configured to communicate with the processor. The second receiver is configured to receive payment information from a transmitter in communication with a payment apparatus, upon positioning of the transmitter in close proximity to the second receiver. The second receiver is configured to be installed in a range from zero (0) inches to thirty (30) inches above a floor surface, such that the second receiver is nearer to the floor surface than the first receiver is to the floor surface.

According to another aspect of the present invention, a mobility assistance device is provided for facilitating or increasing mobility of a user in possession of a payment apparatus. The mobility assistance device comprises a structural member and a transmitter. The transmitter is fixed to the structural member and configured receive payment information from the payment apparatus. The transmitter is configured to transmit the payment information to a receiver upon positioning of the transmitter in close proximity to the receiver. The receiver is configured to communicate the payment information to a processor of a payment processing system.

According to still another aspect of the present invention, a payment facilitating and processing system is provided. The payment facilitating and processing system comprises a payment terminal including a processor and a first receiver, a second receiver, and a mobility assistance device including a transmitter. The first receiver is configured to communicate with the processor. The second receiver is also configured to communicate with the processor. The transmitter is configured to receive payment information from a payment apparatus and transmit the payment information to the second receiver upon positioning of the transmitter in close proximity to the second receiver.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Preferred embodiments of the present invention are described in detail below with reference to the attached drawing figures, wherein.

Figure 1:
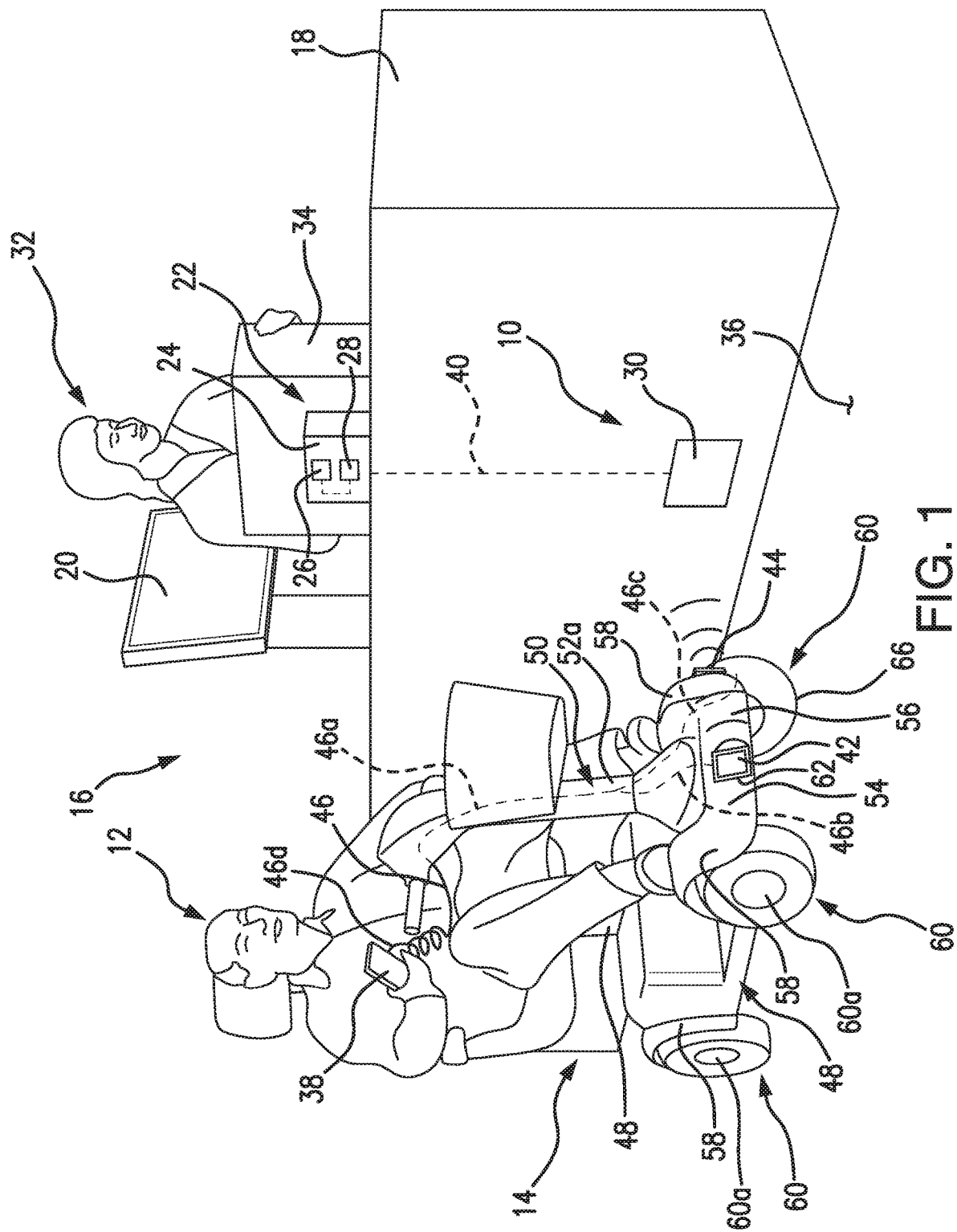
FIG. 1 is a front perspective view of a customer in an electric scooter approaching a checkout area that includes a payment processing system in accordance with a first embodiment of the present invention.

The drawing figures do not limit the present invention to the specific embodiments disclosed and described herein. The drawings do not necessarily provide exact dimensions or tolerances for the illustrated components or structures. However, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (for example, top, bottom, upper, lower, inner, outer and so on) are used solely for the sake of convenience and should be understood only in relation to each other. For instance, a component might in practice be oriented such that faces referred to as "top" and "bottom" are sideways, angled, inverted, and so on relative to the chosen frame of reference.

Figure 2:
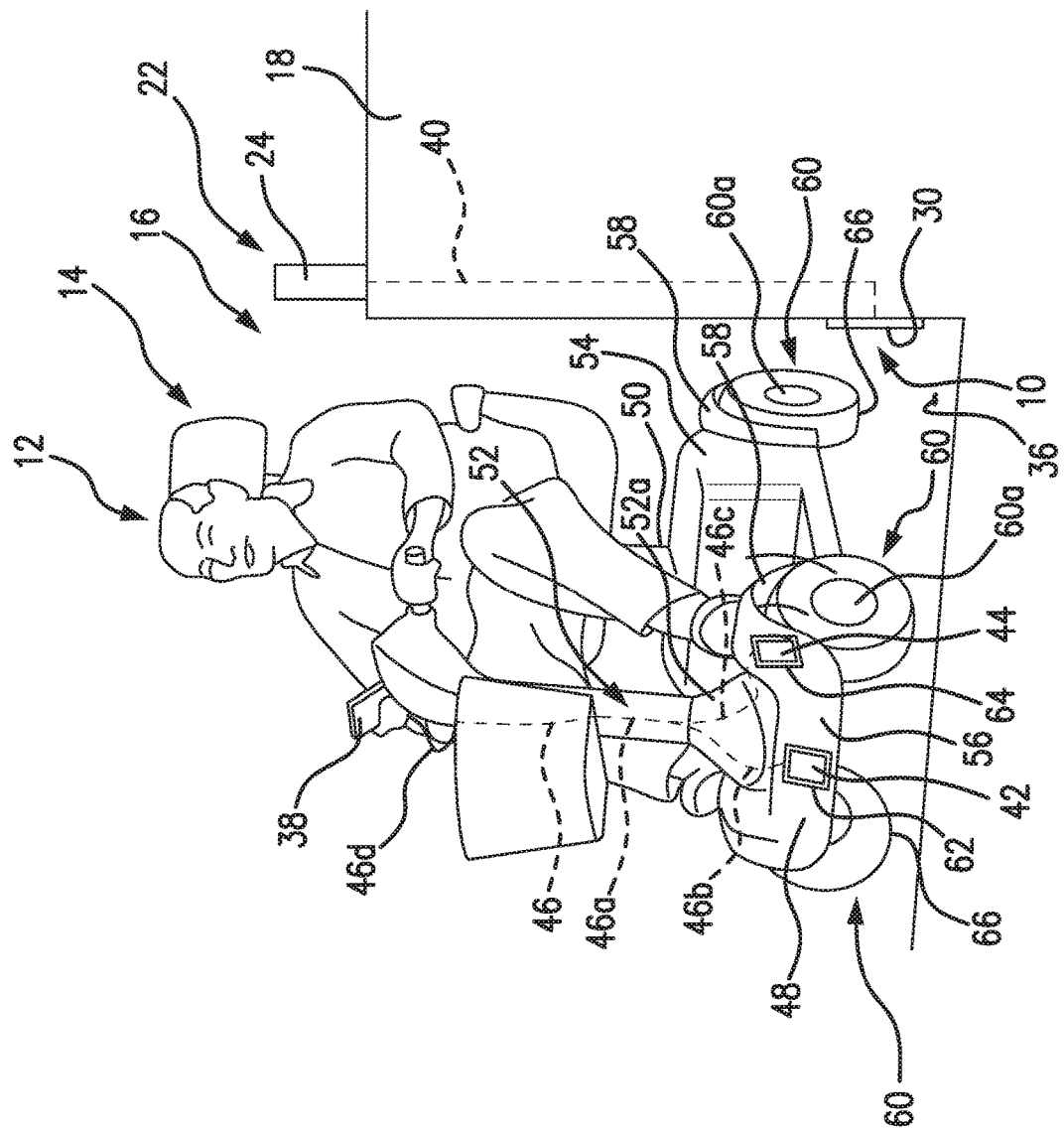
FIG. 2 is a side perspective view of the customer, scooter, and checkout area of FIG. 1, particularly illustrating two transmitters mounted to respective front and side structural members of the scooter.
Figure 3:
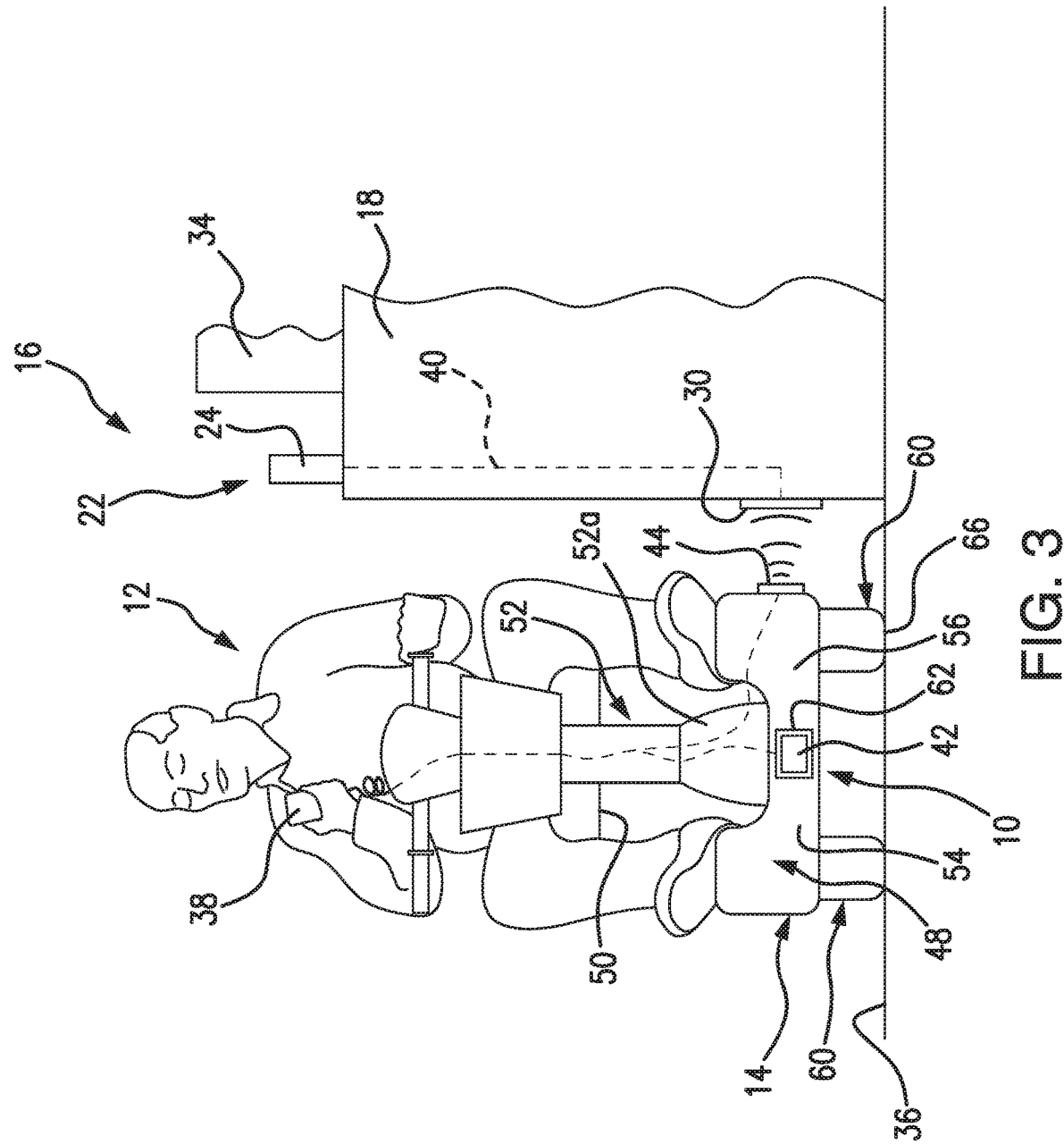
FIG. 3 is a front view of the customer, scooter, and checkout area of FIGS. 1 and 2, particularly illustrating communicatory engagement of the side transmitter of the scooter with a secondary receiver of the payment processing system.

With initial reference to FIGS. 1-3, a payment facilitating and processing system 10 is provided. A customer 12 is seated in a mobility assistance device 14. In the illustrated embodiment, the mobility assistance device 14 is a conventional electric scooter. It is permissible according to some aspects of the present invention, however, for the mobility assistance device to be another form of wheeled mobility device, whether powered or manual, such as a seated, standing upright, sport-specific, variable positioning, transport, aisle, balancing, and/or stair-climbing wheelchair or scooter. Partially or fully tracked, slidable, and/or steppable devices (in contrast to fully wheeled) are permissible as well. In still other embodiments, the device might instead be an adaptive stroller or an ambulation aid such as a walker.

As best shown in FIG. 1, with the aid of the scooter 14, the customer 12 approaches a checkout area 16. The checkout area 16 in the illustrated embodiment includes a counter 18, a monitor 20, and payment processing system 22. The payment processing system 22 includes a payment terminal 24. The payment terminal 24 includes a processor 26 and a primary or first receiver 28. The payment processing system 22 further includes a secondary or second receiver 30. A store clerk 32 stationed in the checkout area 16 scans an item 34 to be purchased by the customer 12.

The first receiver 28 is configured to communicate with the processor 26. More particularly, the first receiver 28 is preferably configured to receive payment information from a payment card, mobile device, or other payment device and transmit such information to the processor 26. The information is then processed by the processor 26 to facilitate a purchase transaction in keeping with any one of a variety of known payment processing methods.

Most preferably, as will be discussed in greater detail below, the first receiver 28 is configured to receive payment information wirelessly.

The scooter 14 is preferably supported by a floor surface 36 of the checkout area 16. The floor surface 36 may comprise a finishing material such as tile, stone, laminate, wood, and so on or may be unfinished or natural (for instance, grass or dirt). The counter 18 preferably extends generally upward from or relative to the floor surface 36, with the first receiver 28 being spaced vertically upward from the floor surface 36.

The first receiver 28 is most preferably disposed at a height conducive for use by an average-sized adult standing on the floor surface 36. For instance, in a preferred embodiment, the first receiver 28 is mounted at least thirty-two (32) inches and less than or equal to forty-eight (48) inches above the floor surface 36. It is also noted that the first receiver 28 and, more broadly, the terminal 24, may in some embodiments be mounted in a partially adjustable manner to allow at least some degree of height and/or lateral position variation. However, the height of the first receiver 28 is such that it is inaccessible to some persons having limited mobility. As will be discussed in greater detail below, the present invention rectifies this deficiency.

Similarly to the first receiver 28, the second receiver 30 is preferably also configured to communicate with the processor 26. More particularly, as will be discussed in greater detail below, the second receiver 30 is preferably configured to receive payment information from a payment apparatus 38 (such as mobile phone, as illustrated, or alternatively a payment card or other payment device) and transmit such information to the processor 26. The information is then processed by the processor 26 to facilitate the purchase transaction in keeping with any one of a variety of known payment processing methods.

Most preferably, as will be discussed in greater detail below, the second receiver 30 is configured to receive payment information via a wireless connection.

The second receiver 30 is preferably communicably connected to the processor 26 via an electronics wire or cable 40. The cable 40 is preferably routed through the interior of the counter 18 in an unobtrusive manner, although external (that is, visible) routing falls within the scope of the present invention. Furthermore, it is permissible according to some aspects of the present invention for wireless communication to occur between the second receiver and the processor. Such communication should be secure to prevent improper access to personal financial or identification information, however.

In a preferred embodiment, the second receiver 30 is spaced from the first receiver 28 so as to be nearer to the floor surface 36 than the first receiver 28 is to the floor surface 36. For instance, in a preferred embodiment, the second receiver 30 is installed in the counter 18 in a range from zero (0) inches to thirty (30) inches above the floor surface 36. More preferably, the second receiver 30 is disposed between about four (4) inches and about ten (10) inches above the floor surface 36.

In a preferred embodiment, as illustrated, front and side transmitters 42 and 44, respectively, are secured to the mobility assistance device 14. In a preferred embodiment, payment information is sent to the transmitters 42 and 44 via the payment apparatus 38 possessed by the customer 12. In the illustrated embodiment, for instance, the customer 12 possesses a payment apparatus 38 in the form of a mobile phone on which a banking or payment application (for instance, digital wallet) has been installed. The mobile phone 38 is connected to each of the first and second transmitters 42 and 44 by an electronic wire or cable 46, such as a USB cable or lightning cable. In the illustrated embodiment, the cable 46 includes a unitary portion 46a that splits into branches 46b and 46c that route to transmitters 42 and 44, respectively. Upon authorization by the customer 12, the application sends payment information to the transmitters 42 and 44, which then broadcast the information as dictated by the chosen communication standard, as discussed in greater detail below.

More particularly, the first receiver 28, the second receiver 30, and the first and second transmitters 42 and 44 each preferably includes an antenna (not shown) including a looped wire (not shown) configured to transmit and/or receive radio signals when current flows through the looped wire. Each respective antenna is preferably a tuned circuit configured to transmit and receive such radio signals in a radio-based communication system including but not limited to Radio Frequency Identification (RFID), Wireless Local Area Network (WLAN) and Wireless Personal Area Network (WPAN) systems.

It is particularly preferable that receivers 28 and 30 and transmitters 42 and 44 are configured to receive and communicate payment information via a radio signal conforming to the Near Field Communication (NFC) standard. That is, the antennas thereof preferably transmit radio signals to and receive radio signals from any other NFC-enabled devices or components. As will be understood by those skilled in the art, in NFC systems, at least one NFC component generates a magnetic field to inductively transfer currents and thereby exchange signals and information with other NFC components positioned within the magnetic field. Thus, signals and information are exchanged between components only when one is positioned within the magnetic field of the other or, alternatively stated, within a predetermined distance or "active range" (as dictated by the reach of the magnetic field).

It is permissible according to some aspects of the present invention, however, for the receivers and transmitters to be alternatively or additionally configured to receive payment information by one or more other mechanisms, including but not limited to wired communications, chips, magnetic strips, and other wireless/non-contact protocols (such as Wifi and so on).

Turning back to the preferred embodiment of the present invention, the broadcast information sent forth by the transmitters 42 and 44 is received by the second receiver 30 only upon at least one of the transmitters 42 and 44 entering close proximity thereto. "Close proximity" in the sense of the present invention is defined as a range of distances across which a desired signal can travel from a source to a receiver, with sufficient clarity to be correctly read by the receiver. Under the NFC standard, for instance, "close proximity" is from about zero (0) centimeters or inches to about four (4) centimeters of about one and one half (1½) inches.

Entry of one of the transmitters 42 and 44 into "close proximity" with the second receiver 30 is illustrated in FIG. 3, in which the customer 12 has steered the mobility assistance device 14 so as to position the side transmitter 44 into close proximity to the second receiver 30. The customer 12 has also authorized transmission of payment information from the payment apparatus or mobile device 38 to the transmitters 42 and 44 via the cable 46 (or other suitable connection). Thus, payment information broadcast by the side transmitter 44 is being received by the second receiver 30 and transmitted to the processor 26 via the wire or cable 40 (or other suitable connection). The customer 12 retains the mobile device 38 during the entire process and is not required to bend, twist, reach, or otherwise engage in potentially difficult motions.

The first and second transmitters 42 and 44 are preferably mounted to a structural member 48 of the scooter 14 in a secure manner such that inadvertent removal or displacement of the transmitters 42 and 44 is unlikely. For instance, the transmitters 42 and 44 might be an integral component of the scooter 14 and thus installed during assembly of the scooter 14. In the illustrated embodiment, for instance, the scooter 14 includes structural members 48 including but not limited to a frame 50; a steering column assembly 52 including a cover 52a; a body 54 including a front cowl 56, the steering column cover 52a, and a plurality of fenders 58-d; and a plurality of wheel assemblies 60 each including a hub 60a. The front transmitter 42 is preferably seated in a well 62 defined in the front cowl 56. The side transmitter 44 is preferably seated in a well 64 defined in the left front fender 58b. The cable branches 46b and 46c are routed behind the fender 58b and cowl 56 before joining together in the unitary portion 46a, which is routed behind the steering column cover 52. The cable 46 is therefore covered (and thus both protected and generally inaccessible) except at a proximal end portion 46d that includes a connector (not shown) for communicably engaging the mobile device 38. It is noted that the end portion 46d preferably includes a coiled section to facilitate extension and retraction of the end portion 46d.

Alternative mounting approaches fall within the scope of the present invention, however. For instance, the transmitters might additionally or alternatively be adhered, latched, screwed, bolted, magnetically secured, potted, overmolded, and/or otherwise fixed to the scooter. Retrofitted designs that enable securement of transmitters to a conventional scooter or mobility assistance apparatus are also permissible. For instance, add-on brackets might be provided.

It is also noted that any of a variety of structural members may be suited for supporting one or more transmitters. For instance, a structural member to which a transmitter is mounted may include one or more of a frame members such as bracket, a fork, a brace, or an arm; a rigging; a bumper; an armrest or a footrest; a seat or a seat pan; a wheel assembly including a hub; a body member such as a fender, apron, cover, or cowl; one of the aforementioned components provided in an add-on form; and so on.

Preferably, the transmitters 42 and 44 are disposed at equal heights as each other relative to a bottom 66 of the scooter 14 (defined by its contact with a floor surface such as the illustrated floor surface 36, or alternatively defined by the bottoms of the wheel assemblies 60).

It is also preferable that the height of the transmitters 42 and 44 match that of the second receiver 30. For instance, in a preferred embodiment, the transmitters 42 and 44 are installed on the scooter 14 at a height in a range from zero (0) inches to thirty (30) inches above the bottom 66. More preferably, the transmitters 42 and 44 are disposed at a height between about four (4) inches and about ten (10) inches above the bottom 66.

The appropriate mounting height for the transmitters 42 and 44 and the second receiver 30 would preferably be standardized such that both retailers and manufactures of ambulation assistance devices or associated retrofitting kits can be assured of cross-compatibility between their transmitter and receiver designs.

Preferably, the transmitters and receiver are marked with standardized or at least clearly understandable indicia illustrative of their purpose.

Although the illustrated payment apparatus 38 is a mobile phone, it is noted that control of the transmitters 42 and 44 may alternatively be through a different form of electronic device (such as a tablet or laptop computer) or another type of device entirely (such as a specifically designed card reader). Furthermore, control may occur manually through a device interface as illustrated, or through use of buttons, a joystick, a blowtube, voice commands, and so on. Still further, it is noted that a variety of user interface applications may be found suitable, depending on the particular control approach that is implemented.

Additional transmitters may be provided without departing from the scope of the present invention. Furthermore, additional secondary receivers may be provided. The receivers may also be configured with a broadened span than illustrated to aid in accommodating potential alignment errors with the transmitter(s).

Although wired communication is preferred between the payment apparatus 38 and the transmitters 42 and 44 for reliability and security, wireless communication (using, for instance, Bluetooth® or another protocol) is permissible. Wireless communication is likewise permissible, although not preferred, between the second receiver 30 and the payment terminal 24. It is particularly noted that, although wireless communication occurs between the transmitters 42 and 44 and the second receiver 30, such communication occurs via a protocol known in the art to be acceptably secure for most consumer transactions due at least in part to the low signal attenuation associated with NFC communications.

Figure 4:
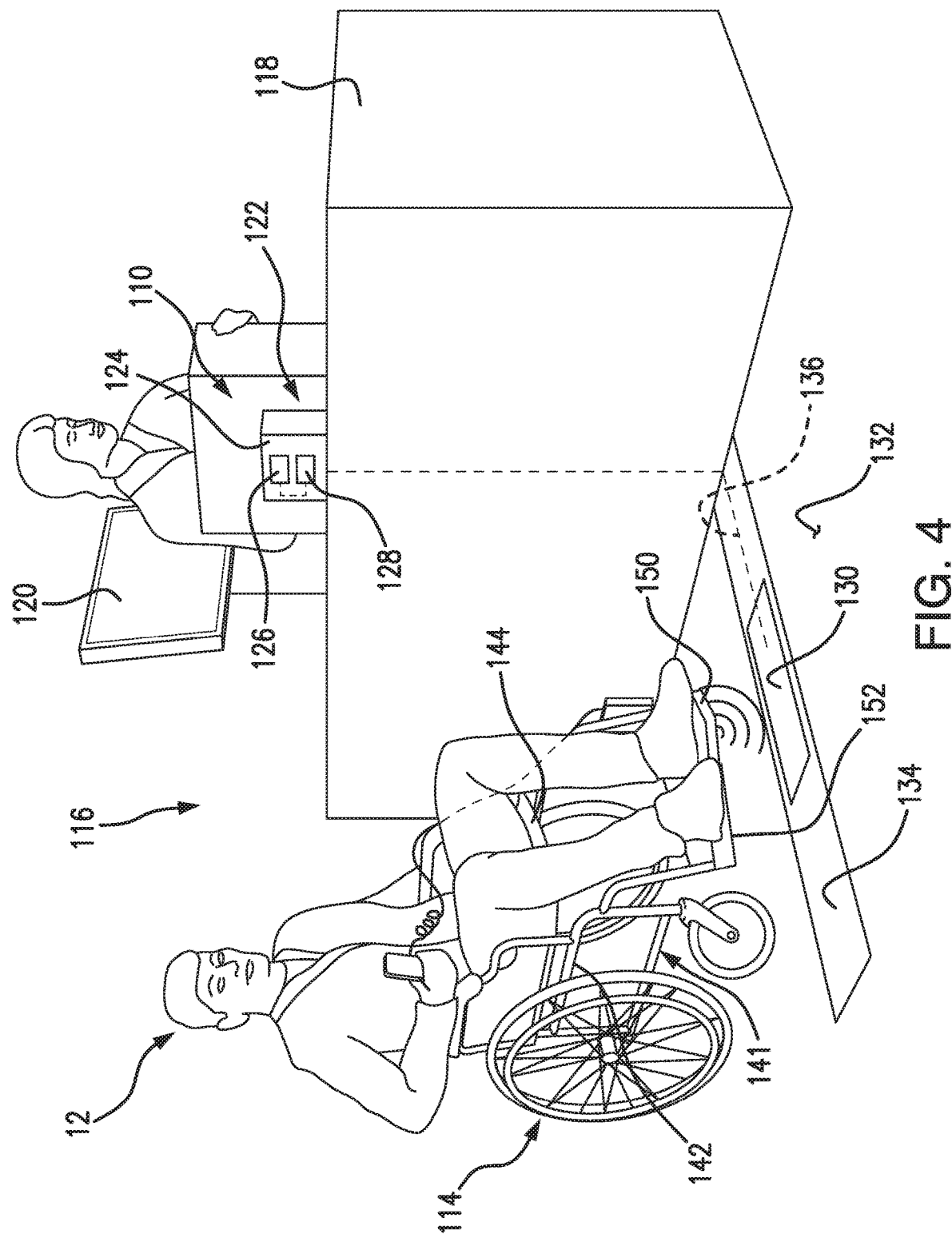
FIG. 4 is a front perspective view of a customer in a manual wheelchair approaching a checkout are that includes a payment processing system in accordance with a second embodiment of the present invention.
Figure 5:
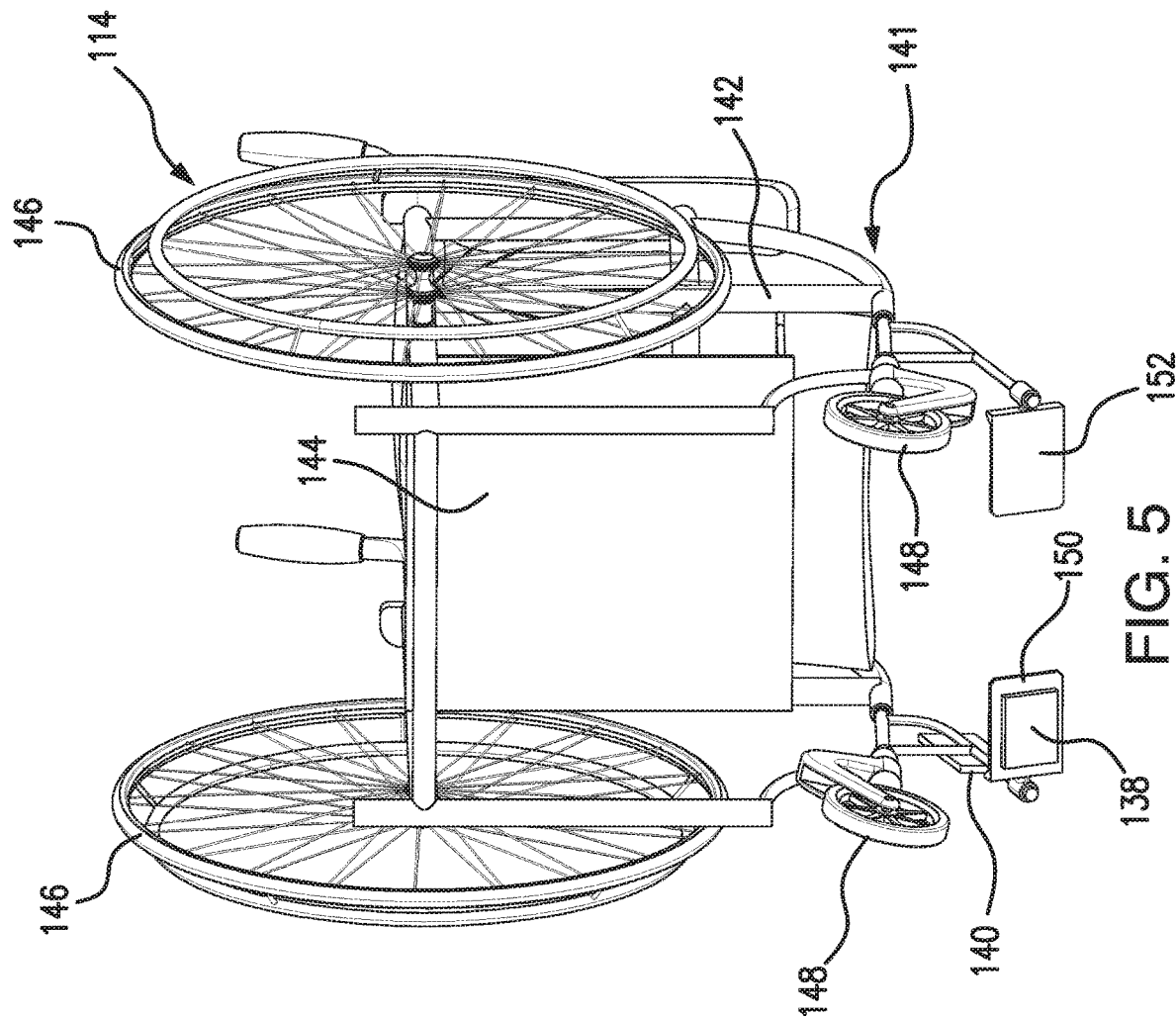
FIG. 5 is a bottom perspective view of the wheelchair of FIG. 4, particularly illustrating two transmitters mounted to respective bottom and side structural members of the wheelchair.
Figure 6:
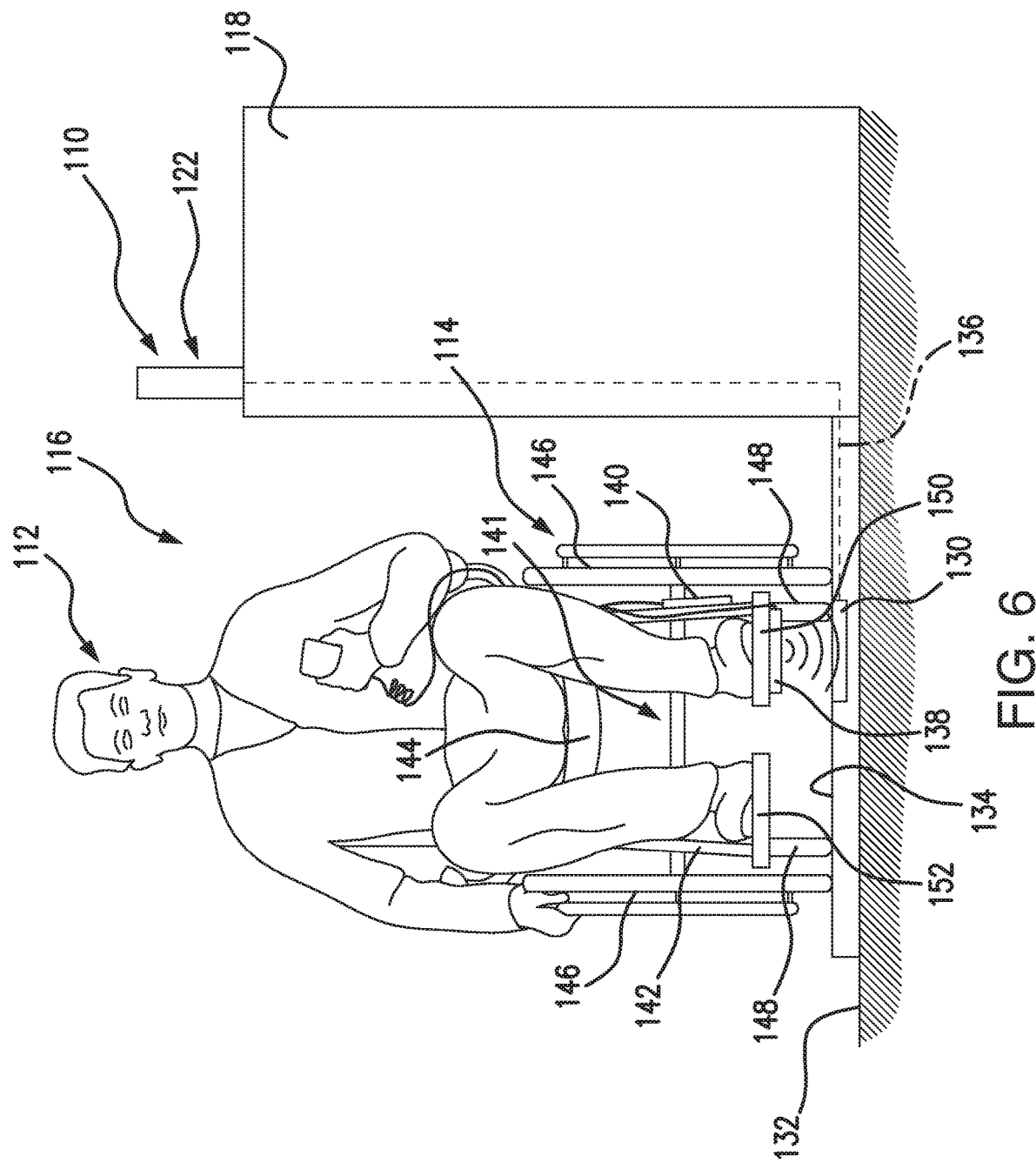
FIG. 6 is a front view of the customer, wheelchair, and checkout counter of FIGS. 4 and 5, particularly illustrating communicatory engagement of the bottom transmitter of the wheelchair with a secondary receiver of the payment processing system.

A second embodiment of the present invention is illustrated in FIGS. 4-6. It is initially noted that, with certain exceptions to be discussed in detail below, many of the elements of the payment facilitating and processing system 110 of the second embodiment are the same as or very similar to those described in detail above in relation to the payment facilitating and processing system 10 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Turning now to FIGS. 4-6, a payment facilitating and processing system 110 is provided. A customer 112 is seated in a mobility assistance device 114. In the illustrated embodiment, the mobility assistance device 114 is a conventional manual wheelchair.

As best shown in FIG. 4, with the aid of the wheelchair 114, the customer 112 approaches a checkout area 116. The checkout area 116 in the illustrated embodiment includes a counter 118, a monitor 120, and payment processing system 122. The payment processing system 122 includes a payment terminal 124. The payment terminal 124 includes a processor 126 and a primary or first receiver 128. The payment processing system 122 further includes a secondary or second receiver 130.

The wheelchair 114 is preferably supported by a floor surface 132 of the checkout area 116. The payment processing system 122 includes a mat 134 that preferably overlies the floor surface 132 adjacent the counter 118. The second receiver 130 is preferably disposed within and integrated with the mat 134. A wire or cable 136 preferably extends through the mat 134 and the counter 118 to connect to the second receiver 130 to the processor 126.

Bottom and side transmitters 138 and 140, respectively, are secured to the mobility assistance device or wheelchair 114. More particularly, in a preferred embodiment, the wheelchair 114 includes structural members 142 such as a frame 142, a seat 144, rear wheel assemblies 146, front wheel assemblies 148, and left and right foot plates 150 and 152. The bottom transmitter 138 is preferably secured to an underside of the left foot plate 150. The side transmitter 140 is preferably secured to a left-side location on the frame 142.

The side transmitter 140 is preferably positioned at a standardized height as discussed above, so as to be compatible with a counter-mounted receiver secondary receiver as might be found in a different checkout area (such as that shown in FIGS. 1-3). The bottom transmitter 138, however, is simply mounted so as to be within a communicable range of the second receiver 130 disposed in the mat 134 when the wheelchair 114 begins to traverse the mat 134, but without causing undue clearance issues. That is, for practical operational purposes, the bottom transmitter 138 should not be mounted in immediate proximity to (contacting or nearly negligibly spaced from) the floor surface 132 but should instead provide sufficient clearance for thresholds, rocks, and so on in keeping with standard mobility assistance device design best practices.

The mat 134 is preferably fixed securely to the floor surface 132 so as to be a fixed component of the checkout area 116. Such fixation may be by means of adhesives, fasteners, latches, and so on. It is permissible according to some aspects of the present invention, however, for the mat to be moveable.

Preferably, the mat 134 is marked with standardized or at least clearly understandable indicia (not shown) illustrative of the location of the second receiver 130 therewithin, enabling the customer 112 to readily navigate the wheelchair 114 into an appropriate position relative to the mat 134 for aligning the bottom transmitter 138 with the second receiver 130.

The payment facilitating and processing system 110 shown in FIGS. 4-6 presents several advantages relative to that of FIGS. 1-3. For instance, positioning of the second receiver 130 in the mat 134 rather than the in the counter 118 enables less precise and space-constrained maneuvering of the wheelchair 114 to align a transmitter to a receiver. More particularly, a customer might find it difficult to maneuver a mobility assistance device (and, specifically, a transmitter mounted thereon) into close proximity to a counter-mounted receiver (see FIGS. 1-3) without inadvertently bumping into the counter. The mat-mounted receiver 130, on the other hand, can be spaced a sufficient distance from the counter 118 to provide a greater space for maneuvering.

Furthermore, retrofitting costs associated with a mat-based system may be lower than those associated with an internally housed counter-based system.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A payment facilitating and processing system for use in a checkout area including a floor surface and at least one of a checkout counter and a floor mat supported on said floor surface, said system comprising:
   a payment terminal including a processor and a first receiver,
   said first receiver configured to communicate with said processor;
   a second receiver spaced from the first receiver and also configured to communicate with the processor; and
   a mobility assistance device for facilitating or increasing mobility across said floor surface of a user in possession of a payment apparatus,
   said mobility assistance device defining a bottom configured to contact said floor surface,
   said mobility assistance device further including a structural member and a transmitter fixed to said structural member at a transmitter height between 0 inches and 30 inches above said bottom,
   said transmitter configured to receive payment information from the payment apparatus and transmit said payment information to said second receiver upon positioning of the transmitter in close proximity to the second receiver, said second receiver configured to be coupled to one of said checkout counter and said floor mat such that the second receiver is nearer to the floor surface than the first receiver is to the floor surface, said second receiver configured to be disposed at a second receiver height between 0 inches and 30 inches above the floor surface, such that positioning of the transmitter in close proximity to the receiver is facilitated, said transmitter configured to transmit a magnetic signal, said first and second receivers configured to receive a magnetic signal.

2. The payment facilitating and processing system of claim 1,
said mobility assistance device being a wheelchair.

3. The payment facilitating and processing system of claim 2,
said wheelchair being a manual wheelchair.

4. The payment facilitating and processing system of claim 1,
said mobility assistance device being a powered scooter.

5. The payment facilitating and processing system of claim 1,
said second receiver height configured to be in a range from 4 inches to 10 inches above the floor surface.

6. The payment facilitating and processing system of claim 5,
said transmitter height being in a range from 4 inches to 10 inches above the bottom of the mobility assistance device.

7. The payment facilitating and processing system of claim 1,
said second receiver configured to be disposed within the mat,
said mat configured to overlie the floor surface and be traversable by the mobility assistance device.

8. The payment facilitating and processing system of claim 7,
said second receiver configured to be integrated with the mat.

9. The payment facilitating and processing system of claim 1, further comprising:
an electronic wire extending between and interconnecting the second receiver and the processor.

10. The payment facilitating and processing system of claim 1,
said structural member comprising at least one of a frame member such as bracket, a fork, a brace, or an arm; a rigging; a bumper; an armrest or a footrest; a seat or a seat pan; a wheel assembly including a hub; and a body member such as a fender, apron, cover, or cowl.

11. The payment facilitating and processing system of claim 1,
said transmitter height and said second receiver height configured to be equal when the bottom of the mobility assistance device is in contact with the floor surface.

12. The payment facilitating and processing system of claim 1,
said first receiver configured to be mounted between 32 inches and 48 inches above the floor surface.

13. The payment facilitating and processing system of claim 1,
said transmitter being between 0 inches and 1½ inches from the second receiver when the transmitter is positioned in close proximity thereto.

14. The payment facilitating and processing system of claim 1,
said second receiver configured to be installed in the counter.

15. The payment facilitating and processing system of claim 1, further comprising:
a third receiver spaced from the first and second receivers and also configured to communicate with the processor,
said third receiver configure to be coupled to the other of said checkout counter and said floor mat such that the third receiver is nearer to the floor surface than the first receiver is to the floor surface.

16. The payment facilitating and processing system of claim 15, said mobility assistance device further including a second structural member and a second transmitter fixed to said second structural member, said second transmitter configured to receive payment information from the payment apparatus and transmit said payment information to said third receiver upon positioning of the transmitter in close proximity to the third receiver.

17. The payment facilitating and processing system of claim 1, said mobility assistance device further including a second structural member and a second transmitter fixed to said second structural member, said second transmitter configured to receive payment information from the payment apparatus and transmit said payment information to said second receiver upon positioning of the transmitter in close proximity to the second receiver.

* * * * *